May 27, 1930.    H. A. SELAH    1,760,011

CONDUIT COUPLING

Filed Feb. 18, 1926

INVENTOR.
Howard A. Selah
BY
ATTORNEYS.

Patented May 27, 1930

1,760,011

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT COUPLING

Application filed February 18, 1926. Serial No. 89,043.

This invention is designed to improve conduit fittings, particularly conduit fittings adapted for use with threadless conduits. The specific embodiment of the fitting shown is in the form of a coupling and involves a desirable manner of forming a coupling having a contractible sleeve arranged within a tubular member converging toward its outer ends. Assembly in the present construction of coupling is formed of two parts which permit of the convenient manufacture of these parts and the assembly with the larger end of the contractible sleeve at the center. The invention further contemplates a desirable method of sealing the fitting.

The invention is illustrated in the accompanying drawings as follows:—

Figure 1:
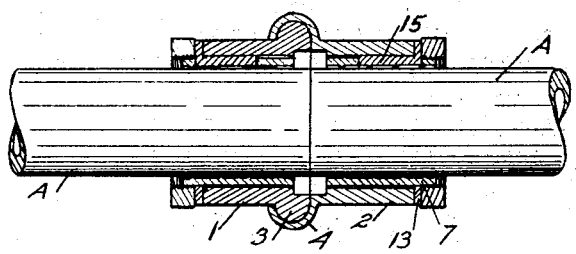
Figure 2:
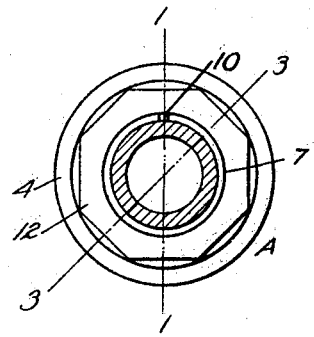

Fig. 1 shows a section on the line 1—1 in Fig. 2.

Fig. 2 an end view of the fitting.

Figure 3:
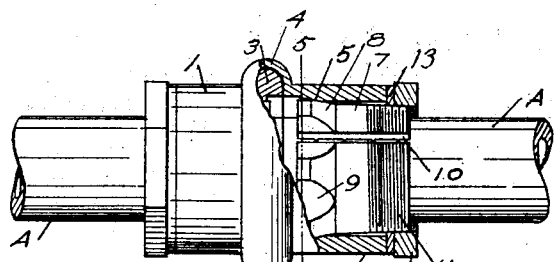

Fig. 3 a section on the line 3—3 in Fig. 2.

Figure 4:
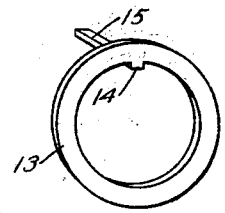

Fig. 4 a detached view of a sealing gasket.

Figure 5:
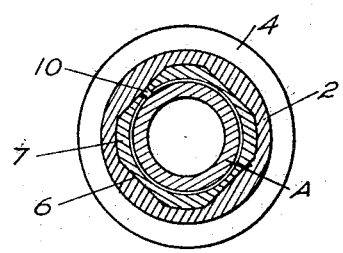

Fig. 5 a section on the line 5—5 in Fig. 3.

A tubular member is made up of the parts 1 and 2. The part 1 has an annular rib or shoulder 3 at its outer end and the member 2 has a lip 4 which after the parts are put together is crimped down and forced around the shoulder thus sealing the center and uniting the parts.

Each part has a tapered outwardly converging surface 5 and a series of flat portions 6 making a portion of the surface out of round.

A contractible sleeve 7 is arranged in each part. The sleeve has a wedging tapered surface 8 engaging the surface 5 and flat portions 9 corresponding to the flat portions 6 locking the sleeve against rotation. The sleeve has a longitudinal slit 10 preferably extending from end to end. The sleeve is screw-threaded at 11, the screw threads extending beyond the end of the tubular member.

A nut 12 is screwed on the end of the sleeve and draws the sleeve axially into wedging engagement with the walls of the tubular member so as to contract the sleeve into clamping engagement with an inserted conduit A. The conduits extend into the coupling from end to end and abut each other closing the ends and thus guard the ends against the abrasive action on the conduit led through the coupling.

In order to seal the coupling against water gaskets 13 are arranged between the end of the tubular member and the nuts. These gaskets have the annular portion which is between the nuts and the ends of the tubular member and in addition have a finger projecting downwradly at 14 into the slit 10 and in addition the finger extends at 15 along the slit 10. When the sleeve is contracted through the action of the nut it forces or draws the edges of the slit 10 together, thus forcing the material projecting into the finger inwardly, forming a close joint on the conduit and outwardly forming a closure along the inner wall of the tubular member. The result is to form a complete closure sealing the fitting.

What I claim as new is:—

In a conduit fitting, the combination of a tubular coupling member formed of united parts, one part having a peripheral shoulder at its inner edge and the other part a lip extending over and engaging the shoulder uniting the parts, each part having a continuous integral annular wall and a wedging inner surface converging toward the ends of the member and a contractible slitted sleeve in each part having a wedging surface engaging the wedging surface of the part and a screw-threaded outer end; and nuts on the outer ends of the sleeves drawing the sleeves into wedging engagement with the member to contract the sleeves.

In testimony whereof I have hereunto set my hand.

HOWARD A. SELAH.